Figure 4:
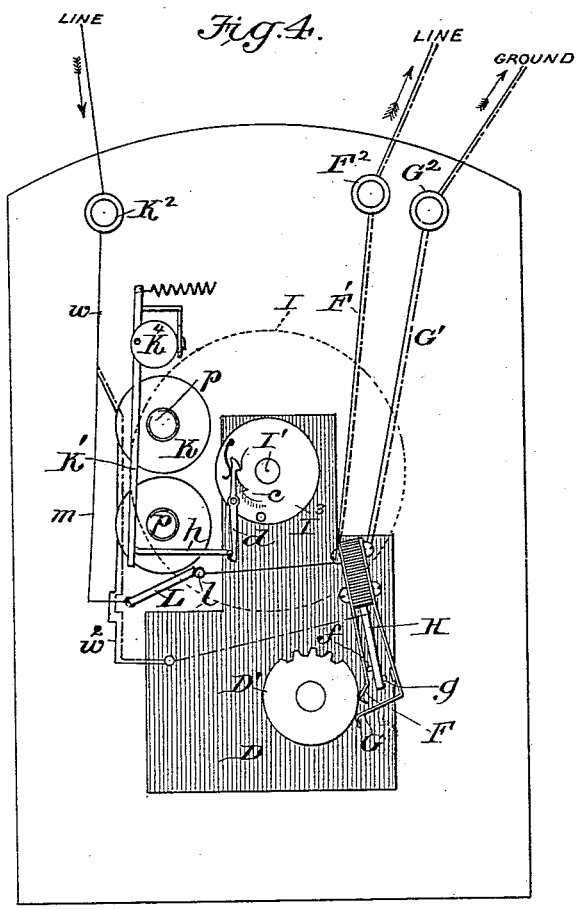

(No Model.)  2 Sheets—Sheet 1.
W. H. GARVEN.
DISTRICT TELEGRAPH CALL BOX.
No. 560,093. Patented May 12, 1896.
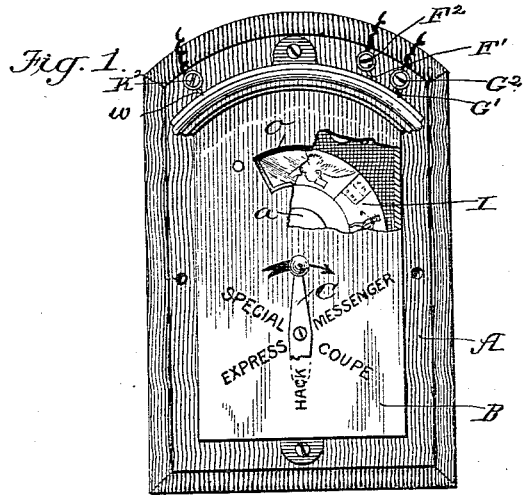
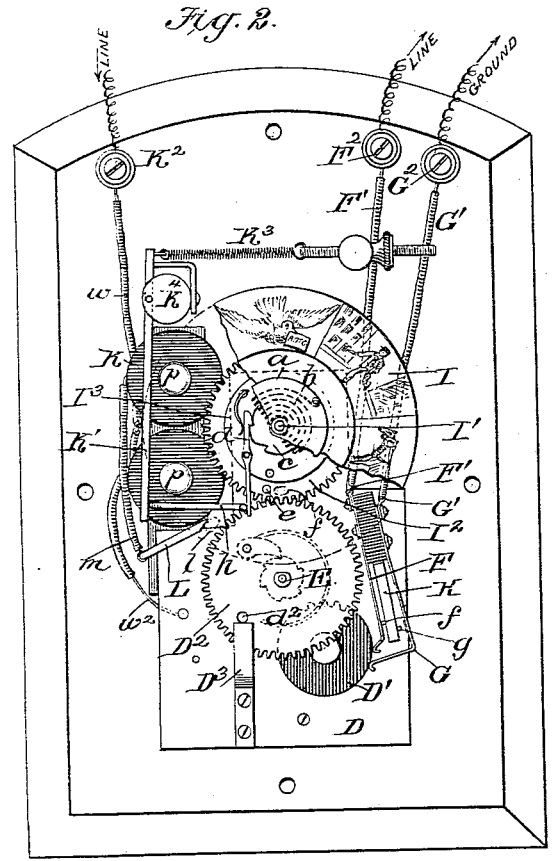
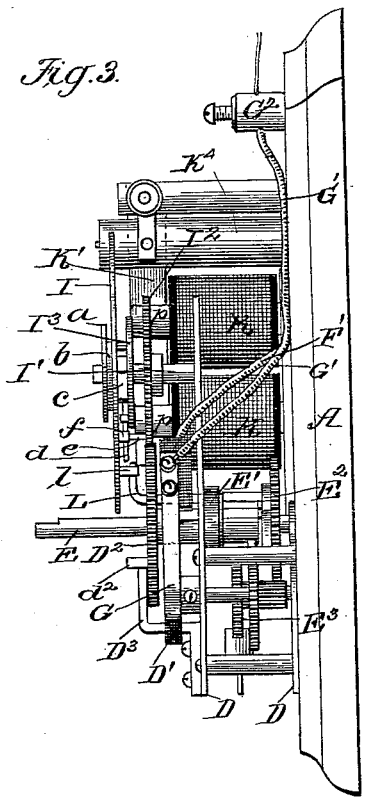
WITNESSES:
Jos. A. Ryan
Finis D. Morris
INVENTOR
William H. Garven
BY Munn & Co.
ATTORNEYS.

(No Model.) 2 Sheets—Sheet 2.
W. H. GARVEN.
DISTRICT TELEGRAPH CALL BOX.

No. 560,093. Patented May 12, 1896.

WITNESSES:
Jos. A. Ryan
Edw. W. Byrn

INVENTOR
William H. Garven.
BY Munn & Co.
ATTORNEYS.

UNITED STATES PATENT OFFICE.

WILLIAM H. GARVEN, OF PORTLAND, OREGON.

DISTRICT-TELEGRAPH CALL-BOX.

SPECIFICATION forming part of Letters Patent No. 560,093, dated May 12, 1896.

Application filed June 19, 1895. Serial No. 553,335. (No model.)

*To all whom it may concern:*

Be it known that I, WILLIAM H. GARVEN, of Portland, in the county of Multnomah and State of Oregon, have invented a new and useful Improvement in District-Telegraph Call-Boxes, of which the following is a specification.

My invention is in the nature of an improved district-telegraph call-box designed to indicate by a visual pictorial representation the thing called for, and provided with means for an answer in return from the central office indicating that the call has received attention. It is an improvement upon the call-box patented to me September 4, 1894, No. 525,649; and it consists in the arrangement of the visual pictorial representation upon a rotary disk geared to the shaft of the operating-crank for a commensurate throw, and also in the special construction and arrangement of the answer-back mechanism and other details, as will be hereinafter fully described.

Figure 1 is a front view of the box, partly broken away. Fig. 2 is a front view with the outside casing removed and a part of the visual signal broken away. Fig. 3 is an edge view from the right-hand side with the case removed, and Fig. 4 is a diagram of the circuits.

In the drawings, A represents the wooden board, to which is detachably fastened by screws the cast-iron box or casing B. Through the latter the crank-handle C of the device projects, and about it is marked or printed in the arc of a circle, at different points along the same, the various wants—such as "Messenger," "Coupé," "Hack," "Express," "Special," &c.—and to call any one of these the crank-handle is, as usual, simply deflected in the direction of the arrow until it reaches the particular want and is then released. Above the crank-handle is a segmental window $o$, preferably glazed, and behind which, in concentric relation to the center of the segment, is pivoted a visual disk-signal, upon which, in position corresponding in spacing to the spacing of the wants printed on the front of the box, is printed or painted pictorial delineations of these several wants, any one of which may be successively brought opposite to the window, so as to show through the same whenever the crank-handle is moved to the corresponding marking on the front of the box. A picture of a dove marks the normal position of rest.

Within the box there is mounted upon the supporting-board a metal frame-plate D, carrying a main shaft E, with a coil-spring E', fastened at one end to the shaft and at the other to the frame-plate, and a train of clock-gears $E^2$ and escapement $E^3$, all arranged so that when the shaft is turned it winds up the spring, and when released the spring, through the clock-gear and escapement, causes the shaft to slowly return to its former position. On one of the shafts of this train of gears is a hard-rubber disk D' with notches in its periphery arranged differently for each call-box, which serves as a circuit-breaker peculiar to that box. Bearing on the periphery of the non-conducting disk are two contact-springs F and G, which make contact, respectively, with pins $f$ and $g$ on an intermediate metal bar H in electrical connection with the frame-plate. The inner one of these contact-springs F is normally in contact with its contact-pin $f$; but when said spring descends into a notch it is out of contact with its pin, and said spring is connected to a wire F', leading to binding-post $F^2$. The other contact-spring G is normally out of contact with its pin $g$; but when it drops into a notch it passes into contact with its pin. This spring is connected to a wire G', leading to the binding-post $G^2$.

On the main shaft E is a rigid gear-wheel $D^2$, bearing a pin $d^2$, which rests against a bracket-shaped stop $D^3$ on the frame-plate and limits the return movement of the crank. This gear-wheel $D^2$ meshes with and imparts an equal movement to another gear-wheel $I^2$, which actuates the signal-disk I. This signal-disk is loosely hung upon an axial pin I', rising from the frame-plate D and is rotated by the crank-handle main shaft and two intermediate gears $D^2$ and $I^2$, as follows: Outside the signal-disk is a small disk or cap $a$, rigidly fixed to the axial pin I', and between the cap and the disks I is arranged a slender coil-spring $b$, fastened at one end to the stationary cap and at the other end to the signal-disk and adapted to restore the latter to its normal position when turned away from the same. On the inner side of the signal-disk is rigidly fixed a ratchet-wheel $c$, adapted to be engaged and locked by a spring-pawl $d$, pivoted upon a plate $I^3$, which is rigidly fixed upon the axial pin $I'$. Now when the crank-handle is turned to a definite point on the face of the box the gear $D^2$ turns the gear $I^2$ an equal distance, and a pin $e$ on the gear $I^2$ strikes a lug $f$ on the back side of the signal-disk and turns the latter an equal distance, causing its pictorial design corresponding to the indication on the box to appear at the window. As the disk I turns to this position the ratchet-wheel $c$ on its back side is caught by the pawl $d$ and held to such position until released by answer from the central office.

The answering device consists of a pair of electromagnets K, having a wire $w$ on one side leading to binding-post $K^2$ and a wire $w^2$ on the other side leading to the metal frame of the instrument, and having also extended pole-pieces $p\ p$, arranged parallel to the axial pin carrying the disk, and an armature $K'$, arranged upon the side of said extended pole-pieces and fulcrumed in a post $K^4$ and held away from said pole-pieces by a spring $K^3$ and adjusting-screw. On the outer end of the armature is an arm $h$, whose end lies in the plane of the pawl $d$. When these magnets are energized by a current from the central office, the armature is drawn inwardly, and the arm $h$ strikes against the outer end of the pawl and, unlocking the disk, allows the latter to respond to the action of its spring under the cap and return to its normal position or starting-point. When it so returns, a lug $l$ on the inner side of the disk strikes against a standard L, and as the standard is connected by a wire $m$ with the wire $w$ leading to the binding-post $K^2$ the current is shunted around the magnets and the armature released whenever lug $l$ on disk I strikes against standard L on the return of the disk to its normal position.

The operation of my call-box is as follows: The current from the central office passes on a closed metallic circuit through all the instruments and back to the central office. It enters each instrument at the binding-post $K^2$ (see Fig. 4) and passes through wires $w$ and $m$ to standard L, to lug $l$ on the disk, and thence through the metal frame of the instrument to the bar H, thence to contact $f$, spring F, wire $F'$, and binding-post $F^2$ to line again. Now if the instrument be operated, when the crank turns the disk I it takes away the lug $l$ on the disk from the arm of standard L, thereby opening the shunt around the magnets, and causing the current to flow, as indicated in dotted lines in Fig. 4, from binding-post $K^2$ through wire $w$, the coils of magnets K, thence through wire $w^2$ to metal frame D and bar H, and as the spring F enters the notches of the disk $D'$ the breaks in the circuit are made between contact-pin $f$ and spring F, and such message is transmitted over wire $F'$ and binding-post $F^2$ to the central office. At the same time the spring G is also operated by the notches in disk $D'$, and by closing contact with pin $g$ on bar H transmit similar impulses over a separate ground-circuit by wire $G'$ and binding-post $G^2$. The current passing over these circuits and making these signals, it will be seen, passes through the magnets K; but this current has no effect upon the armature of the magnet, because its armature is so adjusted by its spring $K^3$ and set-screw as to be unresponsive to such current. When the crank is moved to the indicated want and the disk I correspondingly moved, the disk is caught and locked in this position by its pawl $d$, while the clock mechanism and escapement are running down and transmitting signals through the notched disk. After the signal has been received at the central office the answer back that the message has been received is given from the central office, and this is done by throwing upon the line a current from a stronger battery, which causes the magnet K to attract its armature. This movement of the armature causes the arm $h$ to press upon the pawl $d$ and unlock it from the ratchets of the disk, and the latter then, responding to its coil-spring $b$, flies back to the normal position and indicates to the person calling that the call has been received. As the disk I flies back to its normal position its lug $l$ strikes arm of standard L and stops thereagainst, and this, by establishing a short circuit $m$ L $l$ around the magnets, cuts them out of the circuit.

Instead of using pictorial representations on the disk I may use colors or printing or any other arbitrary marking.

Having thus described my invention, what I claim as new, and desire to secure by Letters Patent, is—

1. In a call-box, the combination of a rotary circuit-breaker having an actuating-handle and tension-spring, a rotary disk having a circular series of representations of the several wants or calls, and gearing connecting the disk to the actuating mechanism of the circuit-breaker for causing the setting of the circuit-breaker to impart an equal or commensurate throw to the disk substantially as and for the purpose described.

2. In a call-box, the combination of a rotary circuit-breaker having an actuating-handle and tension-spring, a rotary disk having a circular series of representations of the several wants or calls, gearing for connecting the disk to the actuating mechanism of the circuit-breaker, a detent and ratchet for locking the disk to its set position, a spring restoring the disk to its normal position, and a tripping mechanism under the control of the central office for releasing the disk substantially as and for the purpose described.

3. In a call-box, the combination of a rotary circuit-breaker having an actuating-handle and tension-spring, a rotary disk having a circular series of representations of the several wants or calls, gearing connecting the disk to the actuating mechanism of the circuit-breaker, a detent and ratchet for locking the disk to its set position, a spring for restoring the disk to its normal position, an electromagnet in the line-circuit, and an armature having a tripping-arm for releasing said detent when the magnet is energized from the central office substantially as described.

4. In a call-box, the combination of a rotary circuit-breaker having an actuating-handle and tension-spring, a rotary disk having a circular series of representations of the several wants or calls, a gear-wheel $D^2$, connected with the rotary circuit-breaker, an equal gear-wheel meshing therewith and arranged concentrically with the disk but disconnected therefrom except by tappet-lugs, a ratchet and detent for locking the disk to its set position, a spring for restoring the disk to its normal position, and tripping mechanism for unlocking the detent substantially as shown and described.

5. In a call-box, the combination of a rotary circuit-breaker having an actuating-handle, tension-spring, and gear-wheel $D^2$, a rotary disk having a circular series of representations, a gear-wheel concentric to the disk and connected with the gear-wheel $D^2$ of the rotary circuit-breaker, a detent and ratchet for locking the disk to its set position, a spring for restoring the disk to its normal position, an electromagnet arranged in the line-circuit and having an armature adapted to operate upon and release the detent, a shunt-circuit around the electromagnet, a stop-lug on the disk, and a stop connected with the shunt-circuit and arranged to receive the stop-lug on the disk and cut out the magnets when the disk is restored to its normal position substantially as shown and described.

WILLIAM H. GARVEN.

Witnesses:
THOMAS H. WARD,
R. L. HALL.